United States Patent Office 2,933,472
Patented Apr. 19, 1960

2,933,472

RESINOUS MATERIAL

Alfred R. Bader, Milwaukee, Wis., assignor, by mesne assignments, to S. C. Johnson & Son, Inc., Racine, Wis., a corporation of Wisconsin No Drawing. Application June 14, 1956
Serial No. 591,272

3 Claims. (Cl. 260—47)

This invention relates to novel polyether type resins which contain reactive carboxyls and to a method of preparation thereof, and it has particular relation to epoxy or ethoxyline type resins of the foregoing characteristics which are obtained by reaction in an alkaline medium of epichlorohydrin and a di(hydroxyphenyl) substituted aliphatic monocarboxylic acid.

In a copending application Serial No. 377,002, filed August 27, 1953, it is disclosed to prepare novel polyhydric phenols containing carboxyl groups and being of the generalized formula:

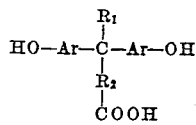

where $R_1$ is an alkyl radical of from 1 to 4 carbon atoms, $R_2$ is an alkylene radical of 2 to 6 carbon atoms, the free valences thereof being on different carbon atoms, and the group Ar is an aryl radical. The compounds are represented by gamma,gamma-p,p'-di(hydroxyphenyl)-valeric acid (also known as 4,4-bis(4-hydroxyphenyl)-pentanoic acid) which is of the formula:

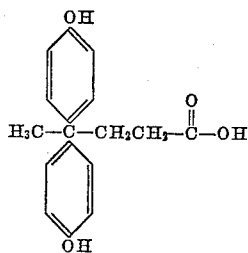

In accordance with the provisions of the present invention, the foregoing compounds are caused to react with an epihalohydrin such as epichlorohydrin, preferably in an alkaline medium, to provide a novel epoxy or ethoxyline class of resins, the molecules of which may be at least in part represented by the following generalized formula:

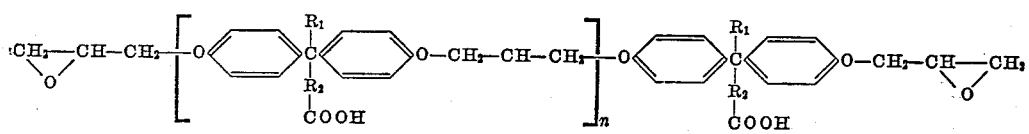

where $R_1$ and $R_2$ have the significance previously indicated, and $n$ is a whole number from about 0 to 7. It is likely that the epichlorohydrin also reacts with at least a part of the carboxyls to give relatively complex epoxy or ethoxyline type resins, the structure of which, at present, is not completely understood. Still other types of reactions may also occur.

The hydrogen of the carboxyls may also be replaced either before or after the reaction of the compound with epichlorohydrin, by condensation with alcohols to form ester groups of the structure,

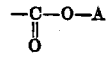

where A is the organic portion of the alcohol. For example, the carboxyl groups may be caused to react with alcohols, such as methyl alcohol, ethyl alcohol, butyl alcohol, allyl alcohol, stearyl alcohol, oleyl alcohol and with castor oil, to provide modified ethoxyline or epoxy type compounds containing ester side chains.

Likewise replacement of the hydrogen of the carboxyl may be by metals such as potassium, sodium, copper, mercury, zinc or the like, to form salts. Such replacement may, at least in some instances, improve the resistance of coatings formed of the material to fungus growth.

The replacement of the hydrogen of the carboxyls by groups A may be conducted either before or after the reaction with the epihalohydrin.

The carboxyls may also be caused to undergo amidation as with ammonia, primary and secondary amines, such as ethyl amine, diethyl amine, ethylene diamine, diphenyl amine, phenylene diamine and many others. These resins may be dissolved in solvents and are adapted for spreading upon surfaces of wood, steel, stone or concrete to provide films which can be baked to provide protection for the surface.

In the preparation of di(hydroxy aromatic)alkylidene carboxylic compounds suitable for use as starting materials in the present invention, the preparation of gamma, gamma-p,p'-di(hydroxyphenyl)valeric acid will be used as an illustration. The techniques illustrated in an article by Alfred R. Bader and Anthony D. Kontowicz, Journal of the American Chemical Society, volume 76, page 4465, reported in 1954, may be employed. This method is as follows:

A cooled mixture of 94 g. (1 mole) of phenol, 58 g. (0.5 mole) of levulinic acid, 45 g. of water and 180 g. of concentrated sulfuric acid was stirred at 25° C. for 20 hours. The reaction is slightly exothermic. The mixture was diluted with water and extracted with ethyl acetate. The organic solution was in turn extracted exhaustively with aqueous sodium bicarbonate, stripped and distilled to yield 20 g. of unreacted phenol. The almost colorless bicarbonate extract was acidified, extracted with ether and the washed ether extract stripped in vacuo to yield 87 g. (0.30 mole, 77 percent yield based on unrecovered phenol) of gamma,gamma-p,p'-di(hydroxyphenyl)valeric acid, an almost colorless glass, M.P. ca. 90° C., acid value found 192, calculated 195.

A similar yield of gamma,gamma-p,p'-di(hydroxyphenyl)valeric acid is obtained with a catalyst mixture of 77 cc. of concentrated hydrochloric acid and 37 cc. of water, and a reaction temperature of 90° C.-95° C. With 85 percent phosphoric acid at 90° C.-95° C. the yield is smaller and the product darker.

The amorphous product forms crystalline solvates with aromatic hydrocarbons. From benzene it crystallizes in flat, white needles, M.P. 120° C.-122° C.; from toluene in stout needles, M.P. 108° C.-109° C.; from m-xylene in flat needles, M.P. 96° C.-98° C. Removal of the solvent of crystallization in vacuo at 90° C. leaves a glass, M.P. ca. 90° C.

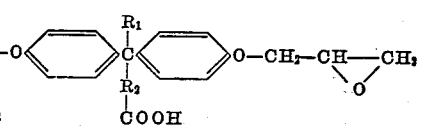

ANALYSIS

Benzene solvate ($C_{17}H_{18}O_4 \cdot \tfrac{1}{2}C_6H_6$)

| Element | Calculated (Percent) | Found (Percent) |
|---|---|---|
| C | 73.82 | 73.48 |
| H | 6.51 | 6.62 |

ANALYSIS

Toluene solvate ($C_{17}H_{18}O_4 \cdot \tfrac{1}{2}C_7H_8$)

| Element | Calculated (Percent) | Found (Percent) |
|---|---|---|
| C | 74.07 | 74.44 |
| H | 6.67 | 7.02 |

A large batch was crystallized solvent-free from a mixture of toluene and acetone, M.P. 168° C.–170° C. It formed hard, white rosettes from water containing a trace of acetic acid, M.P. 171° C.–172° C., and could also be crystallized well from mixtures of heptane and ethyl acetate, or benzene and acetone. Hot solutions of the amorphous modification in aromatic hydrocarbons when seeded with solvent-free crystals, yielded the crystals, M.P. 171° C.–172° C., on cooling.

ANALYSIS

Gamma,gamma-p,p'-di(hydroxyphenyl)valeric acid ($C_{17}H_{18}O_4$)

| Element | Calculated (Percent) | Found (Percent) |
|---|---|---|
| C | 71.31 | 70.99–70.94 |
| H | 6.34 | 6.62–6.46 |

*Infrared spectrographic analysis in EtOH—0.1 percent HOAc*

Lambda max. mμ  225.0 (log E 4.20); 227.5 (infl., log E 4.18)
                279.0 (log E 3.57); 282.5 (infl., log E 3.53)
Lambda min.    250.0 (log E 2.71).

The ultraviolet spectra of the solvates are very similar. The infrared spectrum of gamma,gamma-p,p'-di(hydroxyphenyl)valeric acid in a nujol mull shows a strong band at 12.0 μ (indicative of para substitution), and no band at 13.2–13.4 μ.

Solvent-free, crystalline gamma,gamma-p,p'-di(hydroxyphenyl)valeric acid forms a methyl ester which crystallizes from aqueous methanol with water of crystallization and melts at 87° C.–89° C.

ANALYSIS

Methyl ester ($C_{18}H_{20}O_4$) $\cdot 3H_2O$

| Element | Calculated (Percent) | Found (Percent) |
|---|---|---|
| C | 61.00 | 61.43 |
| H | 7.40 | 7.60 |

The product, as obtained by the reaction of 1 mole of levulinic acid and 2 moles of phenol is predominantly gamma,gamma-p,p'-di(hydroxyphenyl)valeric acid of the formula:

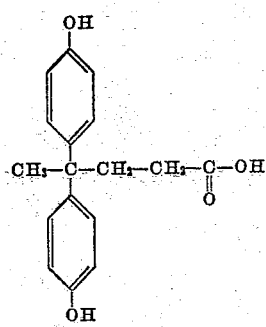

This compound is suitable for reaction with an epihalohydrin such as epichlorohydrin in the manner previously referred to in order to provide a soluble resinous body of the so-called epoxy or ethoxyline type. In the foregoing reaction to form di(hydroxyaromatic) alkylidene carboxylic acids, phenol may be replaced by other hydroxy substituted phenolic compounds free from substituents other than alkyl groups of from 1–4 carbon atoms such as: cresol(ortho, meta, para), xylenols, carvacrol, thymol and the like.

Levulinic acid may be replaced by such keto acids as lactarinic acid, mesitonic, delta-keto caproic acid, geronic acid and the like. It is to be realized that various acids in which the keto group is more remote than the beta position may be employed.

The products of the reaction of the various phenols and the various keto carboxylic acids may be used to react with epihalohydrins in accordance with the provisions of this invention.

EXAMPLE I

In accordance with the provisions of this example, an ethoxyline or epoxy resin is prepared from a reaction mixture comprising:

| | Grams |
|---|---|
| Gamma,gamma - p,p' - di(hydroxyphenyl)valeric acid | 50 |
| Sodium hydroxide | 8 |
| Water | 20 |
| Epichlorohydrin | 22 |

In the reaction of these components, a reaction vessel, such as a flask equipped with suitable conventional appurtenances, such as a thermometer, an agitator, a dropping funnel, condenser and a source of heat, such as an electric jacket, is charged with the gamma,gamma-p,p'-di(hydroxyphenyl)valeric acid together with 25 milliliters of toluene. The mixture is heated to 45° C. and the sodium hydroxide and water are added. The epichlorohydrin is then added slowly and while the charge in the flask is heated. The temperature is held at about 70° C. At this stage, additional toluene in an amount of about 50 milliliters may be added. At the conclusion of about 1 hour and 20 minutes of heating 125 milliliters of water are added and the temperature is raised to 80° C., and 75 milliliters of additional water is added; followed after a period of 30 minutes, by the addition of 200 milliliters more of water. The temperature is maintained at 80° C. while 400 milliliters of denatured alcohol is added and a resin layer separated. This was taken up in toluene and dried by azeotropically distilling the toluene. The resultant resin has a solids content of 82.3 percent by weight and an epoxide equivalency of 2320.

This resin can be applied as a coating medium to wood, steel and the like. It could further be cured in conventional manner by a baking operation. Baking could be promoted by the use of conventional catalysts employed in the interpolymerization of ethoxyline type of resins.

The carboxyls in the resin could be reacted with alcohols, metals (or compounds, amines, etc. as previously described) to form modified products.

EXAMPLE II

The reaction vessel in this instance, comprised a liter flask which was equipped with a stirrer, a reflux condenser and a thermometer. The reaction mixture comprised;

| | Grams |
|---|---|
| Gamma,gamma - p,p' - di(hydroxyphenyl)valeric acid | 35.9 |
| Epichlorohydrin | 385.3 |
| Sodium hydroxide | 17.3 |
| Water | 17 |

In the reaction, the gamma,gamma-p,p'-di(hydroxyphenyl)valeric acid, the epichlorohydrin and the water were charged into the flask. While the mixture was at a temperature of 28° C., 5.70 grams of the sodium hydroxide was added. The mixture was then refluxed at 105° C. for about 15 minutes and 5.70 grams additional of sodium hydroxide was added. The temperature was again brought to the reflux point and was allowed to drop to 95° C. At this point, the last (5.9 grams) of sodium hydroxide was added and the mixture was again brought to gently reflux which condition was maintained for 45 minutes. The mixture was cooled with 380 milliliters of water, which was added when the mixture was at a temperature of 92° C. The mixture was cooled to 55° C. at which point 100 milliliters of denatured alcohol was added. The product settled out and the top water layer was removed. The product was washed with warm water. The product was stripped azeotropically with toluene to provide a product of a viscosity of A and a color of 1 at a solids content of 17.1 percent. The resin contained free carboxyls. It could be employed for various film-forming operations upon wood, steel and the like. It could be applied to the surface and then hardened by baking.

The resin of the example, since it contains free carboxyls, can further be reacted by esterification with various hydroxyl containing compounds such as alcohols, phenols and the like. For example, it can be esterified with such alcohols as ethyl alcohol, methyl alcohol, propyl alcohol, allyl alcohol, etc., to provide useful esters. Likewise, it may be reacted with hydroxy esters such as castor oil to provide modified resins. It is further within the purview of the invention to react the ethoxyline or epoxy resins containing available carboxyls with various amines such as ethyl amine, propyl amine and many others to provide modified bodies.

I claim:

1. A composition of matter consisting essentially of a chain of both terminal and non-terminal aliphatic units chemically bonded through ether oxygen by aromatic units; said terminal aliphatic units being members of the group consisting of (1) 

and (2) $CH_2$—CHOH—$CH_2$— with at least 50% of said terminal aliphatic units being

said non-terminal aliphatic units being

—$CH_2$—CHOH—$CH_2$— and said aromatic units being

wherein X and Y are members of the group consisting of hydrogen and alkyl groups of from 1 to 4 carbon atoms.

2. The composition of claim 1 wherein the aromatic units are

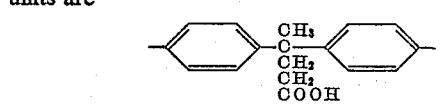

3. The method of preparing a resinous composition comprising heating a mixture of epichlorohydrin and a pentanoic acid consisting essentially of 4,4 bis(4-hydroxyaryl)pentanoic acid wherein the hydroxyaryl radical is a hydroxyphenyl radical and is free from substituents other than alkyl groups of from 1–4 carbon atoms in an alkaline medium capable of forming an alkali salt of a phenolic hydroxyl group at a temperature sufficient to etherify the components, the molar ratio of epichlorohydrin to pentanoic acid being from 1:1 to 40:1.

References Cited in the file of this patent

UNITED STATES PATENTS

| 2,575,558 | Newey et al. | Nov. 20, 1951 |
| 2,665,266 | Wesserman | Jan. 5, 1954 |

OTHER REFERENCES

Bader et al.: J.A.C.S., vol. 76, pp. 4465–4466 (Sept. 5, 1954).